(12) United States Patent
Youngberg et al.

(10) Patent No.: US 8,630,953 B1
(45) Date of Patent: Jan. 14, 2014

(54) METHODS AND SYSTEMS FOR CREATING A TRANSACTION LIFECYCLE FOR A PAYMENT CARD TRANSACTION

(75) Inventors: David C. Youngberg, St. Charles, MO (US); Michael J. Pope, Florissant, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/618,422

(22) Filed: Sep. 14, 2012

(51) Int. Cl.
*G06Q 40/00* (2012.01)

(52) U.S. Cl.
USPC .............................................. 705/44; 705/35

(58) Field of Classification Search
USPC ................................. 705/30, 44, 35
See application file for complete search history.

(56) References Cited

U.S. PATENT DOCUMENTS

| | | | |
|---|---|---|---|
| 7,778,930 B2 * | 8/2010 | Roberts et al. | 705/64 |
| 7,925,652 B2 | 4/2011 | Merz et al. | |
| 7,958,052 B2 | 6/2011 | Powell | |
| 8,001,585 B2 | 8/2011 | Hogan et al. | |
| 8,027,890 B2 | 9/2011 | Kelly et al. | |
| 8,086,534 B2 | 12/2011 | Powell | |
| 8,095,438 B2 | 1/2012 | Carroll et al. | |
| 8,126,791 B2 | 2/2012 | Chisholm | |
| 2010/0070393 A1 * | 3/2010 | Wells et al. | 705/30 |

OTHER PUBLICATIONS

US_Fed_News_Service; "Publication No. Wo/2009/108409 Published on Sep. 3 . . . "; US state News; Sep. 11, 2009.*
US_Fed_News_Service (#2); "US patent Issued to Oracle Aermica on Nov. 16 for Method and Apparatus for Recovering from System Bus Transaction Errors"; US states News; Nov. 17, 2010.*

* cited by examiner

*Primary Examiner* — Edward Chang
(74) *Attorney, Agent, or Firm* — Armstrong Teasdale LLP

(57) ABSTRACT

Methods and systems for labeling payment transactions with a transaction lifecycle label using a lifecycle labeling computer system are provided. The system stores authorization, clearing and fraud data associated with a plurality of payment transactions within a database. The system further generates a first table of matching transaction identifiers for a first group of transactions included within the plurality of transactions by matching authorization data to clearing data for the first group of payment transactions The system then generates a second table of matching transaction identifiers for a second group of transactions included within the plurality of transactions by matching clearing data to fraud data for the second group of payment transactions The system also generates a third table of matching transaction identifiers by comparing the first table of transaction identifiers to the second table of transaction identifiers using the lifecycle labeling computer system.

31 Claims, 9 Drawing Sheets

METHODS AND SYSTEMS FOR CREATING A TRANSACTION LIFECYCLE FOR A PAYMENT CARD TRANSACTION

BACKGROUND OF THE INVENTION

This invention relates generally to methods and systems for creating a transaction lifecycle for a payment transaction involving a payment card, and more specifically, to computer-implemented methods and systems for matching authorization data generated as part of a payment transaction involving a payment card with clearing data and fraud data generated as part of the same payment transaction.

Issuers of payment cards face lost revenue and significant costs for fraudulent transactions. At least some known fraud detection systems are used by payment card issuers for detecting at least some fraudulent transactions initiated over a payment card network. These known fraud detection systems use different processes and/or models to detect fraud. However, these known fraud detection system are not perfect, and thus, it is possible for at least some fraudulent transactions to be authorized under certain conditions. Of course is also possible that a known fraud detection system may detect a fraudulent transaction, and thus, label an authorized transaction as fraudulent when certain conditions apply. Unfortunately, none of these known fraud detection systems are able to link fraud data generated as part of a payment transaction to authorization data generated as part of the same payment transaction. This inability to link fraud data to authorization data prevents issuers from being able to better identify potentially fraudulent transactions at the authorization stage of the transaction process.

Accordingly, a system is needed to match fraudulent transaction data with corresponding authorization transaction data to improve fraud detection system capabilities at the authorization stage of the payment transaction process.

BRIEF DESCRIPTION OF THE INVENTION

In one embodiment, a computer-implemented method for labeling payment transactions with a transaction lifecycle label using a lifecycle labeling computer system is provided. The lifecycle labeling computer system includes a processor and is in communication a database, and the payment transactions are initiated by a cardholder using a payment card over a payment system. The method includes storing transaction data associated with a plurality of payment transactions within the database. The transaction data includes authorization data having a first set of transaction identifiers, clearing data having a second set of transaction identifiers, and fraud data having a third set of transaction identifiers. The method also includes generating a first table of matched transaction identifiers for a first group of payment transactions included within the plurality of payment transactions by matching authorization data to clearing data for the first group of payment transactions based at least in part on corresponding transaction identifiers included in both the first set of transaction identifiers and the second set of transaction identifiers. The method further includes generating a second table of matched transaction identifiers for a second group of payment transactions included within the plurality of payment transactions by matching clearing data to fraud data for the second group of payment transactions based at least in part on corresponding transaction identifiers included in both the second set of transaction identifiers and the third set of transaction identifiers. The method includes generating a third table of matched transaction identifiers by comparing the first table of transaction identifiers to the second table of transaction identifiers using the lifecycle labeling computer system. The third table of transaction identifiers includes matched authorization transaction identifiers and fraud transaction identifiers from the first and second groups of payment transactions.

In another embodiment, a computer device for labeling payment transactions with a transaction lifecycle label is provided. The computer device comprises a database for storing data associated with a plurality of transactions. The transaction data includes authorization data having a first set of transaction identifiers, clearing data having a second set of transaction identifiers, and fraud data having a third set of transaction identifiers. A processor is communicatively coupled to the database. The processor is further configured to store the transaction data of the plurality of transactions received from the payment card system within the database. The processor also generates a first table of matched transaction identifiers for a first group of payment transactions included within the plurality of payment transactions by matching authorization data to clearing data for the first group of payment transactions based at least in part on corresponding transaction identifiers included in both the first set of transaction identifiers and the second set of transaction identifiers. The processor further generates a second table of matched transaction identifiers for a second group of payment transactions included within the plurality of payment transactions by matching clearing data to fraud data for the second group of payment transactions based at least in part on corresponding transaction identifiers included in both the second set of transaction identifiers and the third set of transaction identifiers. The lifecycle labeling computer system generates a third table of matched transaction identifiers by comparing the first table of transaction identifiers to the second table of transaction identifiers. The third table of transaction identifiers includes matched authorization transaction identifiers and fraud transaction identifiers from the first and second groups of payment transactions.

In yet another embodiment, one or more non-transitory computer-readable storage media having computer-executable instructions embodied thereon for labeling payment transactions with a transaction lifecycle label using a lifecycle labeling computer system is provided. The payment transactions are initiated by a cardholder using a payment card over a payment system. When executed by a computer coupled to a database, the computer-executable instructions cause said computer to store transaction data associated with a plurality of payment transactions within the database. The transaction data includes authorization data having a first set of transaction identifiers, clearing data having a second set of transaction identifiers, and fraud data having a third set of transaction identifiers. The computer further generates a first table of matched transaction identifiers for a first group of payment transactions included within the plurality of payment transactions by matching authorization data to clearing data for the first group of payment transactions based at least in part on corresponding transaction identifiers included in both the first set of transaction identifiers and the second set of transaction identifiers. The computer also generates a second table of matched transaction identifiers for a second group of payment transactions included within the plurality of payment transactions by matching clearing data to fraud data for the second group of payment transaction based at least in part on corresponding transaction identifiers included in both the second set of transaction identifiers and the third set of transaction identifiers. The computer then generates a third table of matched transaction identifiers by comparing the first table of transaction identifiers to the second table of transaction identifiers using the lifecycle labeling computer system. The third table of transaction identifiers includes matched authorization transaction identifiers and fraud transaction identifiers from the first and second groups of payment transactions.

BRIEF DESCRIPTION OF THE DRAWINGS

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary payment account card system having a transaction lifecycle labeling system in accordance with one embodiment of the present invention.

FIG. 3 is an expanded block diagram of an exemplary embodiment of a server architecture of a payment account card system having a transaction lifecycle labeling system in accordance with one embodiment of the present invention.

FIG. 4 illustrates an exemplary configuration of a client system as shown in FIGS. 2 and 3.

FIG. 5 illustrates an exemplary configuration of a server system shown in FIGS. 2 and 3.

FIG. 6 is a data flow diagram showing the transaction lifecycle labeling process being implemented by the payment account card system in accordance with the present invention.

FIG. 7 is a data flow diagram showing the transaction lifecycle labeling process having a transaction labeling module being implemented by the payment account card system in accordance with one embodiment of the present invention.

FIG. 8 is a flow diagram showing the transaction lifecycle labeling process implemented by the systems shown in FIGS. 2, 3, 6, and 7.

DETAILED DESCRIPTION OF THE INVENTION

Figure 1:
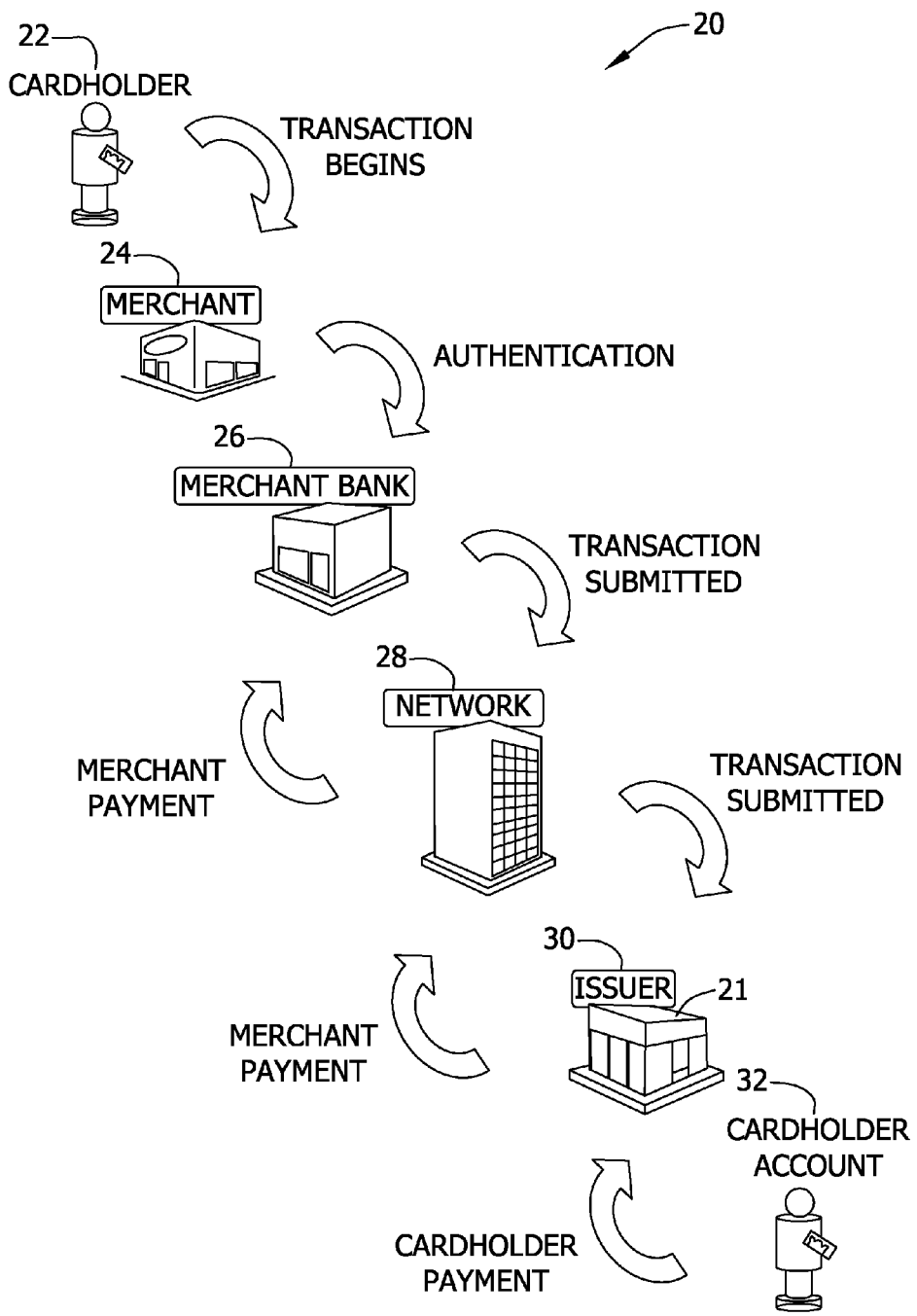
FIGS. 1-8 show exemplary embodiments of the method and system described herein.

Embodiments of the present invention described herein relate generally to a transaction lifecycle labeling computer system used to label a transaction lifecycle for payment transactions initiated with a payment card over a payment card system. The lifecycle labeling process includes matching authorization data with clearing data and fraud data for a particular transaction initiated over a payment card system. Accordingly, the system and process described herein create a "lifecycle label", which includes a linking of authorization data, clearing data, and fraud data, for each transaction.

The payment system processes a plurality of transactions by generating authorization and clearing messages for each transaction, which are passed between the acquirer and the issuer through a payment system sometimes referred to as an interchange network. The payment system includes at least an authorization system, a clearing system, and a fraud detection system. The authorization system extracts authorization data from the authorization message and stores the authorization data in an authorization details database within a data warehouse. Authorization data includes a first set of transaction identifiers. The clearing system withdraws clearing data from the clearing message and stores the clearing data in a clearing details database within the data warehouse. Clearing data includes a second set of transaction identifiers. The fraud detection system analyzes distinctive variables of a plurality of transactions and may assign each transaction a fraud score based on the computed likelihood that a particular transaction is fraudulent. The fraud detection system may also include the fraud score in the authorization message, which is in turn stored in the authorization database. In addition, the fraud detection system stores the data from the potentially fraudulent transactions in a fraud details database within the data warehouse. Fraud data includes a third set of transaction identifiers. The fraud detection system also provides a preliminary list of matching fraud data and clearing data for each transaction identified as potentially fraudulent and stores these matches within the data warehouse. For example, as described herein, the term "fraud detection system" may refer to any system relating to gathering or generating fraud data for a payment transaction and includes a system that provides detailed fraud data from card issuers including, for example, detailed fraud data from a known system called the SAFE System ("System to Avoid Fraud Effectively").

The first set of transaction identifiers (authorization data) includes a plurality of transaction identifiers, at least some of which are also included in the second set of identifiers (clearing data). This enables the first and second sets of identifiers to be matched together to generate the first table of common transaction identifiers for a first group of payment transactions. The first group of payment transactions may be identified based at least in part on a transaction date, among other transaction factors. Thus, the first table, and first group of transactions, may include all transactions occurring during a predetermined period of time. The second set of transaction identifiers (clearing data) further includes a plurality of transaction identifiers that are also included in the third set of identifiers (fraud data). This enables the second and third sets of identifiers to be matched together to generate the second table of common transaction identifiers for a second group of payment transactions. Similarly, the second group of payment transactions may be identified based at least in part on a transaction date, among other transaction factors, and may include transactions in common with the first group of transactions. The first set of transaction identifiers having authorization data and the third set of transaction identifiers having fraud data have no common identifiers, which leads to the difficulty in matching authorization data to fraud data.

Additionally, the payment system is in communication with a transaction lifecycle labeling system that includes a transaction labeling module. The transaction lifecycle labeling system links the payment system and the data warehouse and has access to the data warehouse including a plurality of databases such as an authorization and fraud matches table, an unmatched authorization and fraud candidates table, a temporary fraud label table, and a final fraud label table. The transaction lifecycle labeling system retrieves and analyzes authorization data, clearing data, and fraud data, along with the preliminary fraud and clearing matches, from their respective databases. The first table of transaction identifiers is then generated by matching authorization data and clearing data for each payment transaction from the first group of transactions based on any corresponding sets of transaction identifiers associated with authorization data and clearing data. The second table of transaction identifiers is generated by matching fraud data and clearing data for each payment transaction from the second group of transactions based on the corresponding sets of transaction identifiers associated with fraud data and clearing data. The transaction lifecycle labeling computer system also generates a third table of transaction identifiers by comparing the first table to the second table, and matching authorization data and fraud data for each payment transaction based on the corresponding sets of transaction identifiers associated with authorization data and fraud data. Because not every authorized transaction included in the initial table being reviewed is fraudulent, not all authorization transaction data will have corresponding fraud data, so there will only be matching authorization and fraud data for those transactions which were initially authorized and later reported as fraud by the payment card issuer.

In the example embodiment, the transaction labeling module included within the transaction lifecycle labeling system compares the first table having matched transaction identifiers for authorization data and clearing data to the second table having matched transaction identifiers for clearing data and fraud data to generate a third table listing matched transaction identifiers for authorization data and fraud data. In other words, the third table may reflect each transaction identified as potentially fraudulent for a predetermined period of time and matched with the corresponding authorization data. The third table is stored in a temporary fraud label table. Because the third table may not include all transactions included within the first table (since all transactions may not have been labeled potentially fraudulent), the transaction labeling module further generates a fourth table of transaction identifiers by matching the second table of transaction identifiers having matched clearing and fraud data to the first set of transaction identifiers having authorization data. The fourth table of transaction identifiers is labeled candidate authorization and fraud data matches and includes the matching authorization and fraud transaction identifiers of the third table along with unmatched authorization and fraud transaction identifiers. The unmatched transaction identifiers represent the authorization data for which there is no fraud reported and is stored in a table labeled unmatched candidates. The unmatched candidates table may be subjected to a rules database containing structured query language to identify additional transaction identifiers having matching authorization data and fraud data, which are combined with the matched authorization and fraud data from the third table in the temporary fraud label table.

The temporary fraud label table having the matched transaction identifiers of authorization data and fraud data from the third table and the additional matched authorization data and fraud data identified by the rules database are combined into a final fraud label table with any unmatched fraud data in a final fraud label table such that the final fraud label table contains all transaction identifiers having matched authorization data and fraud data in addition to any unmatched fraud data from the plurality of transactions.

The final fraud label table of matched transaction identifiers having matched authorization data and fraud data from the same transaction generated by the transaction labeling module as part of the transaction lifecycle labeling system in may then be used to create a report on the lifecycle of a transaction that allows for the identification of a small percentage of transactions that were initially approved, but later proved to have been fraudulent or reported by the customer as being fraudulent. This report may then be used by modelers of the fraud detection system to modify the fraud detection system so that it may better recognize a fraudulent transaction in real time at the authorization stage of the transaction.

As used herein, the terms "data," "authorization data," "clearing data," "fraud data," "transaction data," and "transaction identifier" refer to any data that may be used to assist in identification of a transaction, such as the amount of sale, the geographic location of a sale, the cardholder's name, the cardholder's address, the cardholder account number, the bank network reference number, the 6-digit authorization code, an acquirer-assigned sequence number, and/or any other data that may be used to identify a transaction. Additionally, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effect may include at least one of: (i) using authorization, clearing, and fraud detection systems to extract transaction information from messages between a merchant and an issuer; (ii) storing the extracted transaction information in separate authorization, clearing, and fraud databases within a data warehouse; (iii) combining the separate authorization, clearing, and fraud databases to create a clearing and authorization matches table and a fraud and clearing matches table; (iv) using a transaction labeling module to compare the matches tables to create a link between authorization and fraud data for the same transaction and generate a table of matched authorization data and fraud data; (v) generating a table of candidate authorization and fraud matches by comparing the clearing and fraud matches table to the authorization data; (vi) applying structured query language, a rules table, and authorization data to the unmatched candidate authorization and fraud matches to match any remaining authorization and fraud data missed by transaction labeling module; (vii) storing all matching authorization and fraud transactions in a temporary fraud label table; and (vii) incorporating unmatched fraud details to the temporary table to create a final fraud label table having all fraud data with any corresponding authorization data, thus creating a transaction lifecycle that can be used to better recognize a potentially fraudulent transaction during the authorization phase of payment card system.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of creating a transaction lifecycle and labeling process wherein the transaction lifecycle can be used to better recognize a fraudulent transaction in real time. However, it is contemplated that this disclosure has general application to computing systems in industrial, commercial, and residential applications.

FIG. 1 is a schematic diagram illustrating an exemplary multi-party payment card system 20 for enabling ordinary payment-by-card transactions in which merchants and card issuers do not necessarily have a one-to-one relationship. The present invention relates to payment card system 20, such as a credit card payment system using the MasterCard® payment card system interchange network 28. MasterCard® payment card system interchange network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, New York).

In payment card system 20, a financial institution, such as an issuer 30, issues a payment account card, such as a credit card account or a debit card account, to a cardholder 22, who uses the payment account card to tender payment for a purchase from a merchant 24. To accept payment with the payment account card, merchant 24 must normally establish an account with a financial institution that is part of the financial payment system. This financial institution is usually called the "merchant bank" or the "acquiring bank" or "acquirer bank" or simply "acquirer." When a cardholder 22 tenders payment for a purchase with a payment account card (also known as a financial transaction card), merchant 24 requests authorization from acquirer 26 for the amount of the purchase. The request may be performed over the telephone, but is usually performed through the use of a point-of-sale terminal, which reads the cardholder's account information from the magnetic stripe on the payment account card and communicates electronically with the transaction processing computers of acquirer 26. Alternatively, acquirer 26 may authorize a third party to perform transaction processing on its behalf. In this case, the point-of-sale terminal will be configured to communicate with the third party. Such a third party is usually called a "merchant processor" or an "acquiring processor."

Using payment card system interchange network 28, the computers of acquirer 26 or the merchant processor will communicate with the computers of issuer 30 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by MasterCard International Incorporated®, an authorization code, and/or other transaction identifiers that may be used to identify the transaction.

During the authorization process of the payment card system, the clearing process is also taking place. During the clearing process, acquirer 26 provides issuer 30 with information relating to the sale. No money is exchanged during clearing. Clearing involves the exchange of data required to identify the cardholder's 22 account such as the account number, expiration date, billing address, amount of the sale, and/or other transaction identifiers that may be used to identify the transaction. Along with this data, banks in the United States also include a bank network reference number, such as the Banknet Reference Number used by MasterCard International Incorporated®, that identifies that specific transaction. In foreign countries, banks include a 6-digit authorization code to identify the transaction. These will be discussed in further detail below. When the issuing bank 30 receives this data, it posts the amount of sale as a draw against the cardholder's 22 available credit and prepares to send payment to the acquirer 26.

When a request for authorization is accepted, the available credit line or available account balance of cardholder's account 32 is decreased. Normally, a charge is not posted immediately to a cardholder's account 32 because bankcard associations, such as MasterCard International Incorporated®, have promulgated rules that do not allow a merchant to charge, or "capture," a transaction until goods are shipped or services are delivered. When a merchant 24 ships or delivers the goods or services, merchant 24 captures the transaction by, for example, appropriate data entry procedures on the point-of-sale terminal. If a cardholder 22 cancels a transaction before it is captured, a "void" is generated. If a cardholder 22 returns goods after the transaction has been captured, a "credit" is generated.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

Financial transaction cards or payment account cards can refer to credit cards, debit cards, and prepaid cards. These cards can all be used as a method of payment for performing a transaction. As described herein, the term "financial transaction card" or "payment account card" includes cards such as credit cards, debit cards, and prepaid cards, but also includes any other devices that may hold payment account information, such as mobile phones, personal digital assistants (PDAs), and key fobs.

Figure 2:
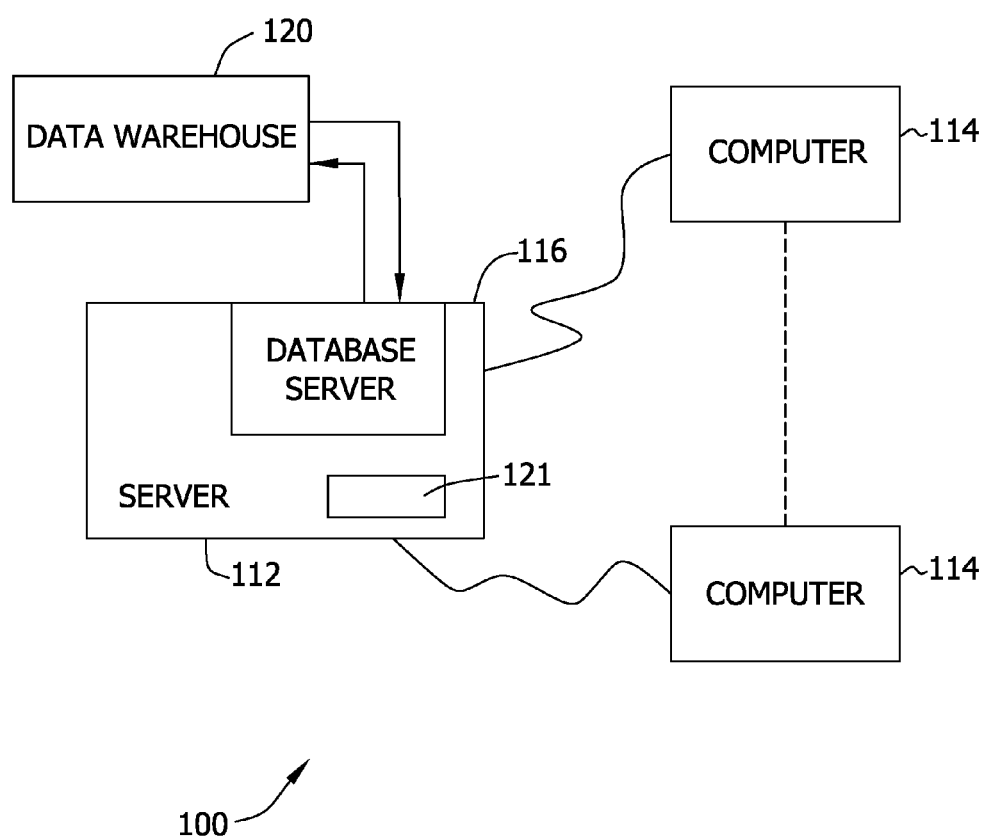

FIG. 2 is a simplified block diagram of an exemplary payment account card system 100 having a transaction lifecycle labeling system 121 in accordance with one embodiment of the present invention. System 100 is a payment account card system, which can be utilized by account holders as part of a process of initiating an authorization request and performing a transaction as described below.

More specifically, in the example embodiment, system 100 includes a server system 112, which is a type of computer system, and a plurality of client sub-systems (also referred to as client systems 114) connected to server system 112. In one embodiment, client systems 114 are computers with point-of-sale terminals including a web browser, such that server system 112 is accessible to client systems 114 using the Internet. In one embodiment, client systems 114 is an input device, which is configured to communicate with server system 112, and is associated with or controlled by a cardholder making a purchase using a payment account card and payment account card system 100.

Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

A database server 116 is connected to a data warehouse 120, which contains information on a variety of matters, as described below in greater detail. Although database server 116 is shown as part of server system 112, database server 116 could be separate from server system 112 and could be a part of data warehouse 120. In one embodiment, centralized data warehouse 120 is stored on server system 112 and can be accessed by issuers or merchants at one of client systems 114 by logging onto server system 112 through one of client systems 114. In an alternative embodiment, data warehouse 120 is stored remotely from server system 112 and may be non-centralized. In system 100, transaction data can be communicated from clients systems 114 to server system 112 and stored in data warehouse 120 via database server 116. Data warehouse 120 may store transaction data generated as part of sales activities conducted over the bankcard network 28 including data relating to merchants 24, account holders or customers 22, and purchases. Data warehouse 120 may also store the bank network reference number, authorization code, and/or other transaction identifiers that may be associated with each transaction. Data warehouse 120 may also store account data including at least one of a cardholder name, a cardholder address, an account number, and other account identifier. Data warehouse 120 may also store merchant data including a merchant identifier that identifies each merchant registered to use the payment account card network, and instructions for settling transactions including merchant bank account information. In one embodiment, a transaction lifecycle labeling system 121 is in communication with both data warehouse 120 and server system 112, which can be accessed by issuers or merchants at one of client systems 114 by logging onto server system 112 through one of client systems 114.

In the example embodiment, one of client systems 114 may be associated with acquirer 26 while another one of client systems 114 may be associated with an issuer 30, yet another client system 114 may be associated with merchant 24, and server system 112 may be associated with payment card system interchange network 28.

Figure 3:
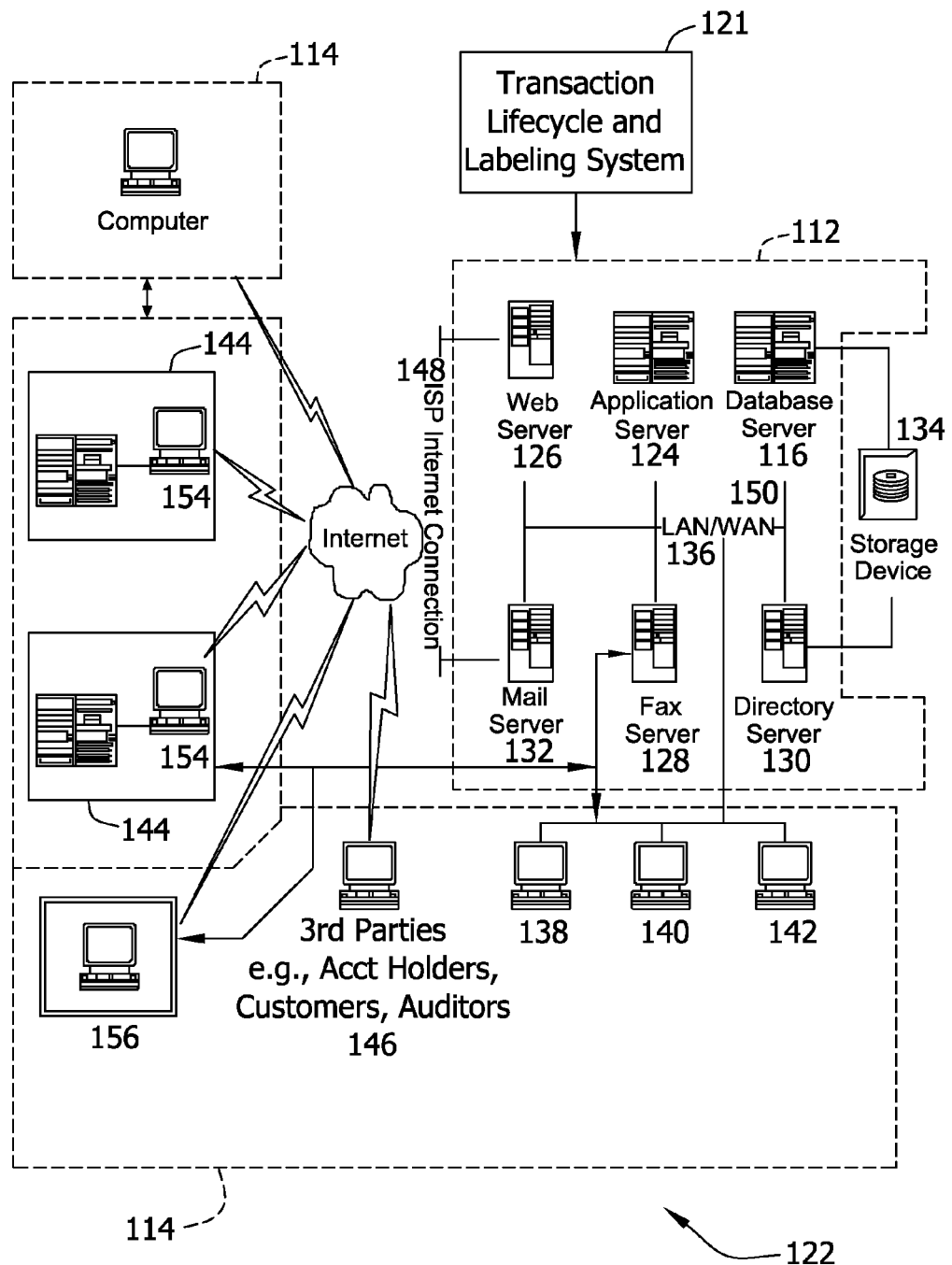

FIG. 3 is an expanded block diagram of an exemplary embodiment of a server architecture of a payment account card system 122 having a transaction lifecycle labeling system 121 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator workstation 138, a cardholder workstation 140, and a supervisor workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
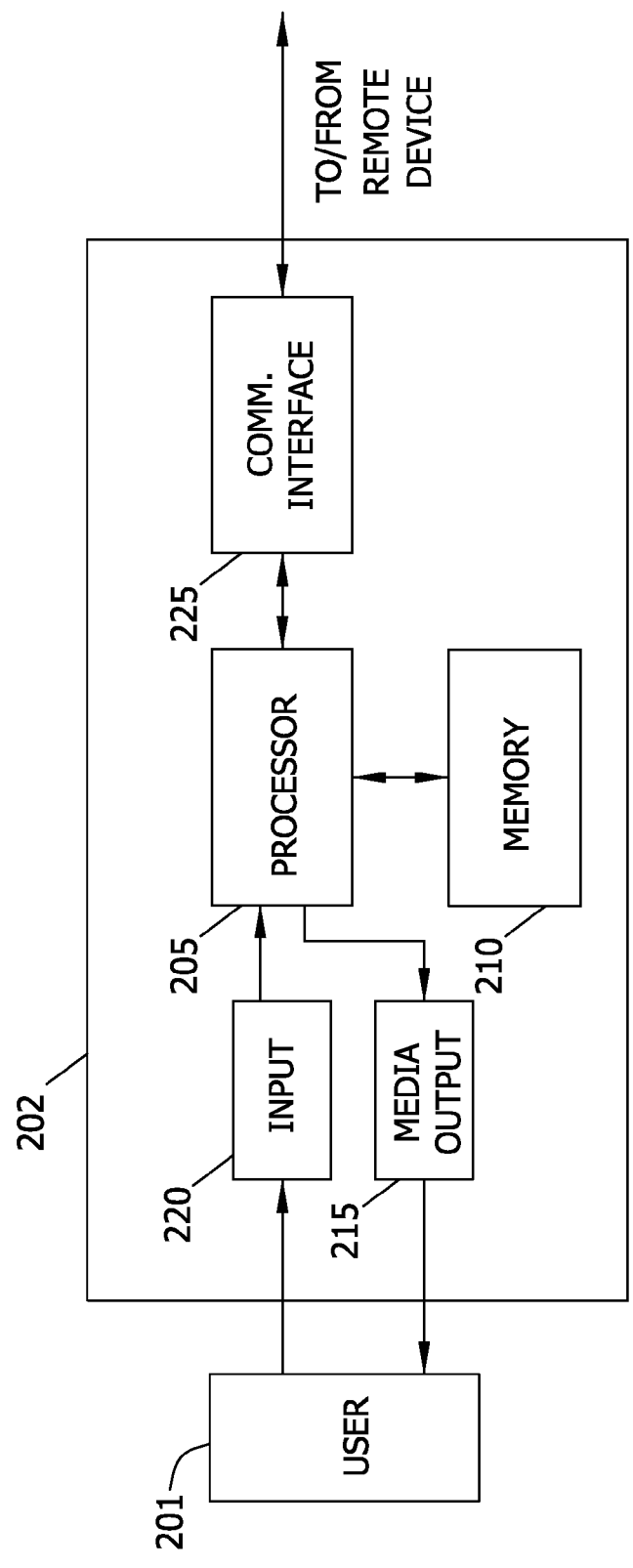

FIG. 4 illustrates an exemplary configuration of a cardholder computer device 202 of a client system as shown in FIGS. 2 and 3. Cardholder computer device 202 may include, but is not limited to, client systems 114, 138, 140, and 142, workstation 154, and manager workstation 156 (shown in FIG. 3).

Cardholder computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

Cardholder computer device 202 also includes at least one media output component 215 for presenting information to cardholder 201. Media output component 215 is any component capable of conveying information to cardholder 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computer device 202 includes an input device 220 for receiving input from cardholder 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Cardholder computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to cardholder 201 via media output component 215 and, optionally, receiving and processing input from input device 220. A user interface may include, among other possibilities, a web browser and client application. Web browsers enable cardholders, such as cardholder 201, to display and interact with media and other information typically embedded on a web page or a website from server system 112. A client application allows cardholder 201 to interact with a server application from server system 112.

Figure 5:
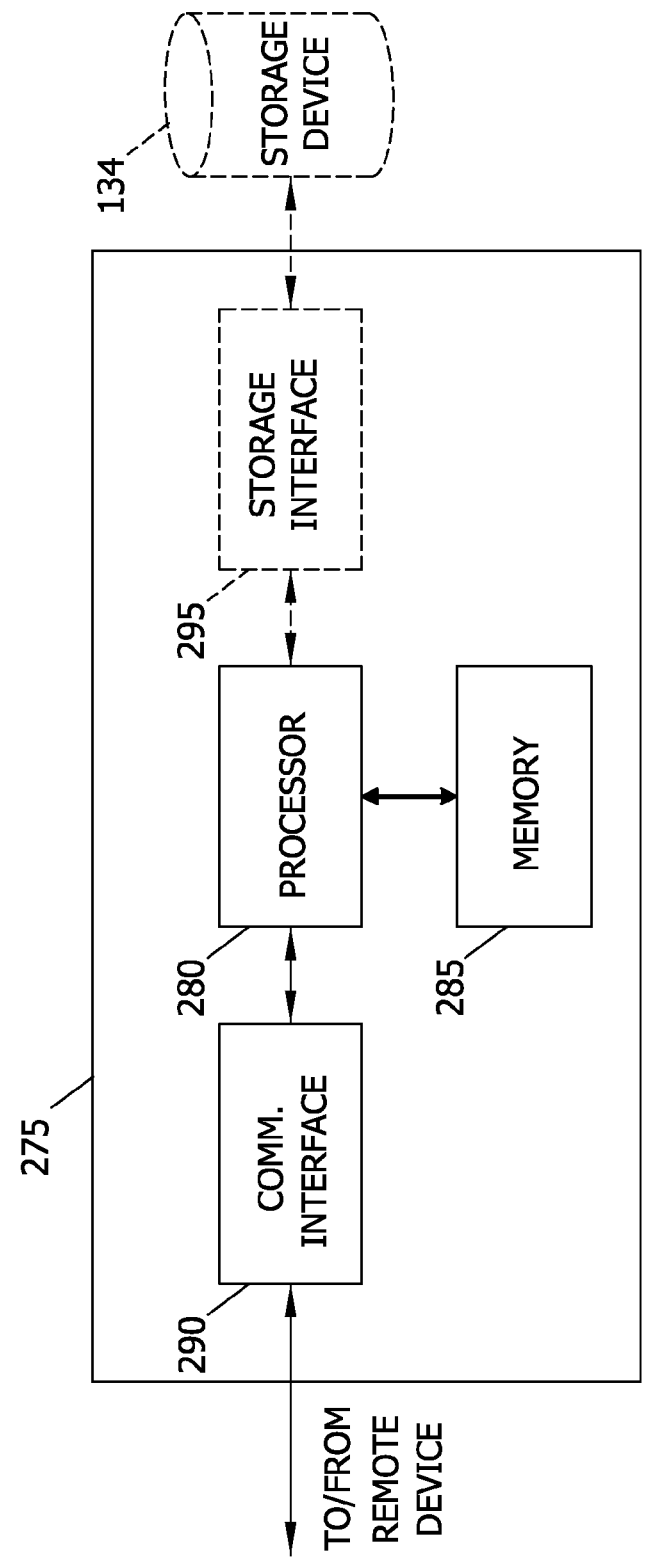

FIG. 5 illustrates an exemplary configuration of a server computer device 275 of server system 112 as shown in FIGS. 2 and 3. Server computer device 275 may include, but is not limited to, database server 116, transaction server 124, web server 126, fax server 128, directory server 130, and mail server 132.

Server computer device 275 includes a processor 280 for executing instructions. Instructions may be stored in a memory area 285, for example. Processor 280 may include one or more processing units (e.g., in a multi-core configuration).

Processor 280 is operatively coupled to a communication interface 290 such that server computer device 275 is capable of communicating with a remote device such as cardholder computer device 202 or another server computer device 275. For example, communication interface 290 may receive requests from client systems 114 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server computer device 275. For example, server computer device 275 may include one or more hard disk drives as storage device 134. In other embodiments, storage device 134 is external to server computer device 275 and may be accessed by a plurality of server computer devices 275. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory areas 210 and 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
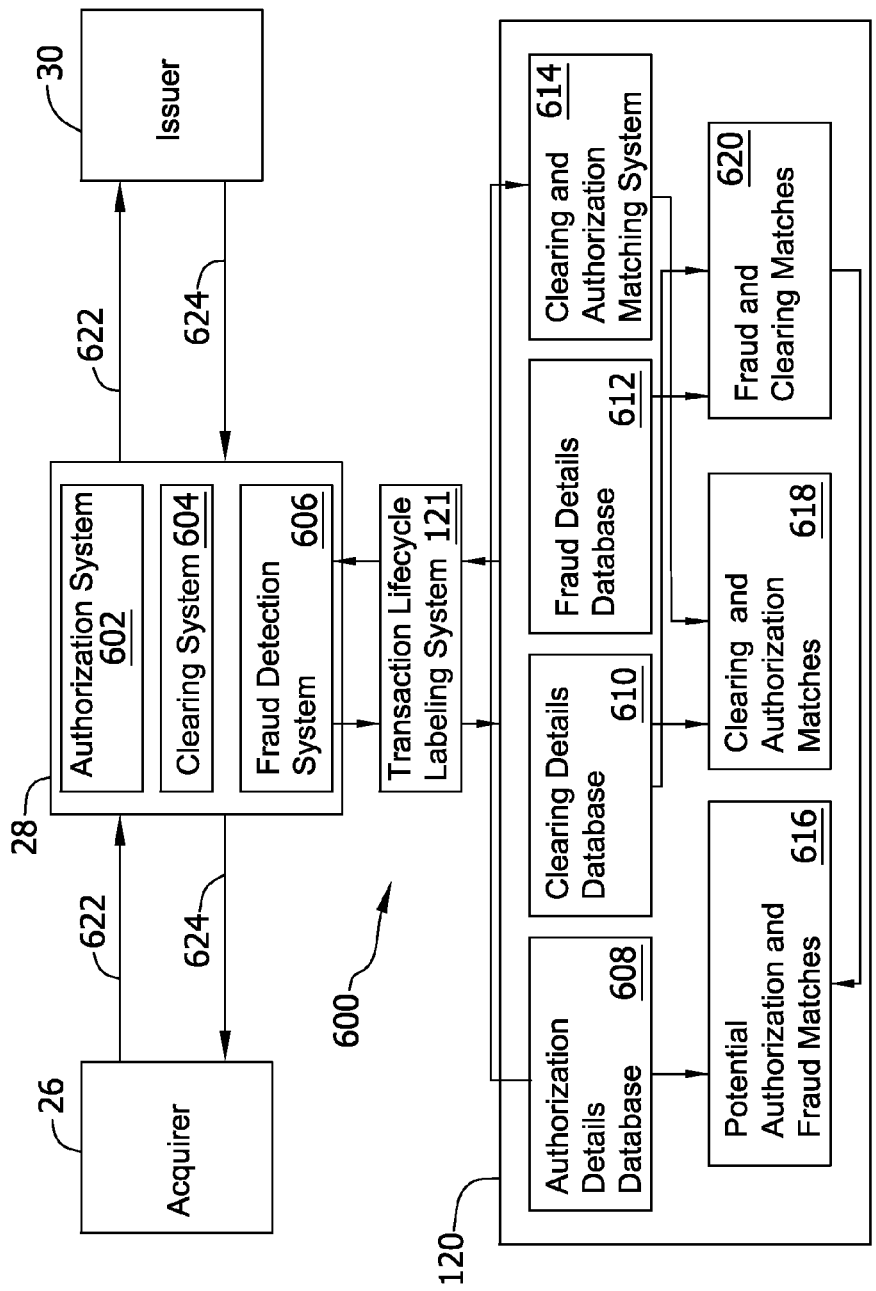

FIG. 6 illustrates a data flow diagram showing a data storage and retrieval system 600 and transaction lifecycle labeling system 121 that are included in payment account card system 100 (shown in FIG. 2).

Data storage and retrieval system 600 includes server system 112 and data warehouse 120 and may be used with payment account card system 100 shown in FIGS. 2 and 3. Components in system 600, identical to components of system 100, are identified in FIG. 6 using the same reference numerals as used in FIG. 2.

System 600 stores and retrieves all the data created from each transaction such that a lifecycle of each transaction may be created. During the initial steps of a transaction, the merchant 24 sends a request message 622 through the payment card system interchange network 28 and its server system 112 to the issuer 30. Request message 622 contains all information relevant to the transaction such as the cardholder name, account number, expiration date, billing address, amount of sale, and/or any other data that may be used to identify a transaction. Upon receipt of request message 622, issuer 30 confirms the information sent by merchant 24 and verifies that the cardholder's account has the required credit or deposited amount and sends a response message 624 back to merchant 24 through payment card system interchange network 28 that will indicate whether the transaction is authorized. Issuers worldwide are required to assign a 6-digit authorization code to each transaction as one method of identifying each transaction. For transactions occurring within the United States, issuer 30 includes at least a bank network reference number, such as the Banknet Reference Number used by MasterCard International Incorporated®, for the same purpose of identifying each transaction. Request 622 and response 624 messages containing these bank network reference and authorization numbers are part of the clearing process as previously described.

Server system 112 contains at least an authorization system 602, a clearing system 604, and a fraud detection system 606, while a transaction lifecycle labeling system 121 is in communication with both server system 112 and data warehouse 120. Authorization 602 and clearing 604 systems copy the transaction data that they extract from request 622 and response 624 messages and store the information in separate databases located within data warehouse 120. Historic authorization data is stored in an authorization details database 608 within data warehouse 120. Authorization data includes a first set of transaction identifiers. Historic clearing data is stored in a clearing details database 610, also within data warehouse 120. Clearing data includes a second set of transaction identifiers. A clearing and authorization matching system 614 within data warehouse 120 is able to search the authorization and clearing feeds coming into data warehouse 120 through server system 112 for their respective transaction identifiers. The first set of transaction identifiers (authorization data) includes a plurality of transaction identifiers, at least some of which are also included in the second set of identifiers (clearing data). System 614 matches the corresponding bank network reference numbers and/or any other transaction identifiers from the authorization data to the clearing data from U.S. issuers to provide a table of potential matching clearing and authorization transactions for a first group of payment transactions. The first group of payment transactions may be identified based at least in part on a transaction date, among other transaction factors. Clearing details database 610, which incorporates not only the U.S. bank network reference numbers, but also the 6-digit authorization codes received from foreign issuers and/or any other data that may be used to identify a transaction, is then incorporated into the table of potential matching clearing and authorization transaction identifiers to provide an accurate and complete table of authorization data and clearing data with matched transaction identifiers. Prior to using the foreign 6-digit authorization codes, system 614 was limited to only matching U.S. transactions. This first table having matched clearing data and authorization data is stored in a clearing and authorization matches table 618 within data warehouse 120.

Also during the transaction process, fraud detection system 606 uses the data in request 622 and response 624 messages, such as amount of sale, geographic location of the sale, and/or any other data that may be used to identify the transaction to assign a fraud score to the transaction. The fraud data includes a third set of transaction identifiers. The scored transaction is sent to the issuer to authorize or decline based on the fraud score. The issuer may also contact the cardholder for authorization. A transaction cannot be fraudulent until a financial impact has occurred. When an issuer declines a transaction or the cardholder reports fraudulent activity, the issuer then reports such to the fraud detection system 606 which flags the transaction as fraudulent and stores the transaction data as a batch file that is sent in a daily feed to a fraud details database 612 in data warehouse 120. Because the fraud may not be reported to the issuer by the user for some time after the transaction actually occurs, the batch file contains transactions occurring over a 120 day period to verify no other fraudulent activity took place around the time of the reported fraud. Within fraud details database 612 is code that can determine whether the transaction was fraudulent or not, based on the issuer's report, and if not, then the data can be deleted from database 612 or database 612 may update or change the data and send it to a different database. Code within database 612 determines whether or not the transactions have been deleted or changed, which affects the ability to later match fraud data with authorization data. If an authorized transaction is later matched with a fraudulent transaction, but that fraudulent transaction has been deleted or changed by database 612, then that would be a false match between the authorization and fraud data. Database 612 prevents this from occurring.

When fraud detection system 606 flags a transaction as fraudulent, based on the fraud reports from the issuer or the computed fraud score, it stores the fraudulent transaction data, including an acquirer-assigned sequence number and/or any other data that may be used to identify a transaction in fraud details database 612 as the third set of transaction identifiers. Clearing system 604 has previously stored the same transaction data as the second set of transaction identifiers, including the acquirer-assigned sequence number in database 610. Fraud detection system 606 can then search the fraud details database 612 and clearing details database in data warehouse 120 for their respective acquirer-assigned sequence number or other transaction identifiers. The second set of transaction identifiers (clearing data) includes a plurality of transaction identifiers that are also included in the third set of identifiers (fraud data). System 606, including SAFE System, matches at least the corresponding acquirer-assigned sequence number and/or any other transaction identifiers from the fraud data and the clearing data to provide a second table 620 of matched fraudulent and clearing transaction identifiers for a second group of payment transactions. The second group of payment transactions may be identified based at least in part on a transaction date, among other transaction factors, and may contain at least some corresponding transactions with the first group of payment transactions. The second table of transaction identifiers with matched fraudulent data and clearing data is stored in a fraud and clearing matches table 620 within data warehouse 120.

Figure 7:
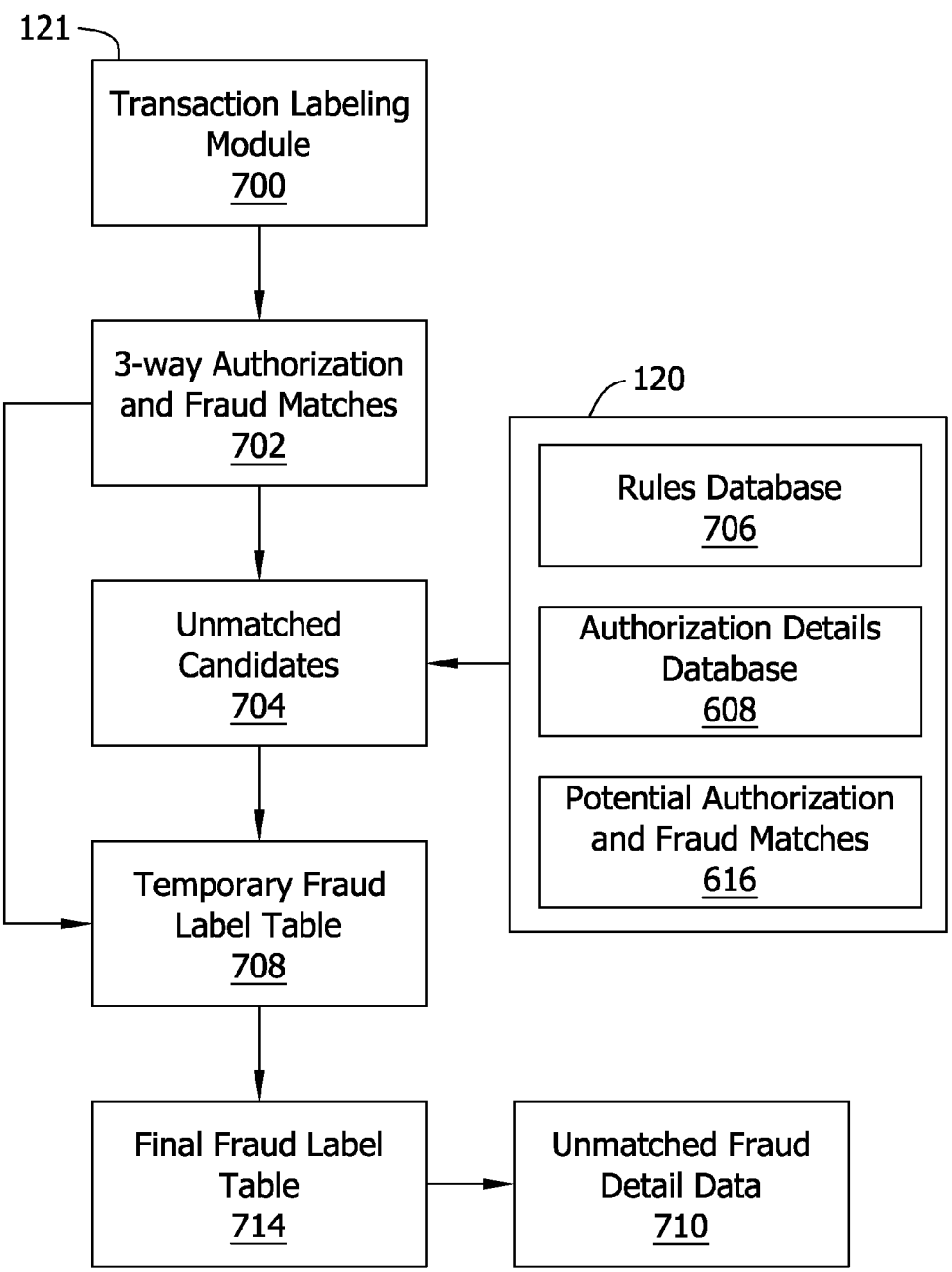

FIG. 7 is a data flow diagram showing the transaction lifecycle labeling system 121 having a transaction labeling module 700 being implemented by payment account card system 100 in accordance with one embodiment of the present invention. Components in system 121, identical to components of system 100 (shown in FIG. 2,), are identified in FIG. 7 using the same reference numerals as used in FIG. 2.

Transaction labeling module 700 is a stored procedure that retrieves data stored in data warehouse 120. The first step undertaken by module 700 is to retrieve matched clearing and authorization transaction identifiers table 618 and matched fraud and clearing transaction identifiers table 620 from data warehouse 120. Transaction labeling module 700 then compares first table 618 to second table 620 to generate a third table 702 of transaction identifiers having matching authorization data and fraud data for each payment transaction common to both the first group and the second group of transactions based on the corresponding sets of transaction identifiers that the first set of identifiers (authorization data) and the third set of identifiers (fraud data) have in common with the second set of identifiers (clearing data). Authorization data cannot be easily linked to fraud data because the first set of transaction identifiers and the third set of transaction identifiers have no corresponding identifiers, so they must be linked by matching them each to the second set of transaction identifiers. The first and second sets of transaction identifiers can be matched at least by the banknet reference number and/or 6-digit authorization code. The third set of transaction identifiers (fraud data) does not contain a banknet reference number or 6-digit authorization code. The second and third sets of transaction identifier can be matched at least by an acquirer-assigned sequence number. The first set of transaction identifiers does not include the acquirer-assigned sequence number.

Transaction labeling module 700 analyzes first table 618 and second table 620 to identify transaction identifiers from the second set of identifiers (clearing data) that occur in both the first set of identifiers (authorization data) and the second set of identifiers (fraud data). When a clearing transaction identifier from first table 618 is matched with a clearing transaction identifier from the same transaction from second table 620, the authorization transaction identifier from first table 618 can be matched with the fraudulent transaction identifier from second table 620. These matches are stored in an authorization and fraud matches table 702 and copied into a temporary fraud label table 708. In other words, the third table may reflect each transaction identified as potentially fraudulent for a predetermined period of time and matched with the corresponding authorization data. Identification of the transaction identifiers generated during the clearing process, and stored independently in first table 618 and second table 620 allows transaction labeling module 700 to match authorization data to fraud data for a transaction that was initially authorized, but later proved to be fraudulent.

Transaction labeling module 700 is responsible for populating third table 702 with approximately 70-80% of possible matched transaction identifiers for authorization and fraud data. The third table 702 may not include all transactions included within the first table 618 because not all transactions may have been labeled potentially fraudulent. This is one reason the first and second group of transactions contain some transactions in common, where the authorized transaction was reported as fraudulent, and some different transactions, where the transaction was authorized and not fraudulent or it was deemed fraudulent before it was authorized. To identify the additional authorization data and fraud data matches, module 700 compares second table 620 having matched fraud and clearing transaction identifiers is to authorization details database 608 having the first set of transaction identifiers to generate a fourth table 616 of candidate authorization and fraud data matches. Because some banking institutions may delay reporting of a fraudulent transaction until after the date the transaction occurs, authorization details database 608 is compared to data from second table 620 within a 120 day range of the reported fraudulent transaction. Fourth table 616 contains matched authorization and fraud transaction identifiers contained in third table 702 as well as unmatched candidate transaction identifiers because there is extraneous data within fourth table 616 that will not be matched. Not every authorized transaction, the details of which are stored in database 608, will have corresponding fraud transaction data because not every authorized transaction is fraudulent. So candidate authorization and fraud matches table 616 contains extra transaction information that will not be matched, but it also contains transaction information that will be matched because some of the authorized transactions will have corresponding fraud data. The unmatched candidates are stored in unmatched candidate table 704.

Unmatched candidates of table 704 are then subjected to a second step of transaction labeling module 700. Module 700 compares the unmatched candidates table 704 to authorization details database 608 and a rules database 706 located within data warehouse 120. Rules database 706 is a set of dynamic structured query language statements where each "rule" in database 706 is expressed as a fragment of structured query language designed to analyze the transaction data of unmatched candidates table 704 and determine matches based on identifying transaction keys such as the date and time of the transaction, amount of transaction, issuer identification number, transaction process date, and/or any other data that may be used to identify a transaction. Application of rules database 706 and authorization details database 608 to unmatched candidates table 704 results in the matching of authorization and fraud data from the first and second groups of transactions, which are stored in temporary fraud label table 708 in addition to the authorization and fraud matches from table 702.

Temporary fraud label table 708 comprising all the identifiable authorization and fraud transaction identifier matches is then moved from temporary fraud label table 708 to a final fraud label table 714 so that it is accessible to the entire data warehouse 120 and therefore useful for reporting. Unmatched fraud details database 710 is then added to final fraud label table 714 such that final fraud label table 714 includes all the identifiable authorization and fraud transaction identifier matches from table 708 and all unmatched fraud data from database 710. Unmatched fraud details database 710 is unmatched transaction identifiers from a daily feed from fraud details database 612 generated by fraud detection system 606. The result of combining table 708 and database 710 is that, each day, final fraud label table 714 maintains a one-to-one ratio of transaction identifiers with unmatched fraud detail database 710, thus keeping table 714 and database 710 in sync for reporting performance and ensuring that every fraudulent transaction is represented in final fraud table 714 whether or not it has a matching transaction identifier with the authorization or clearing transaction identifiers.

The output of final fraud label table 714 is a mapping table with various database primary keys into the different database tables such that, for example, a report on match rates can be generated by joining the fraudulent authorization transactions of final fraud label mapping table 714 with authorization details database 608 to identify the authorization transactions that were later reported as fraudulent. Similarly, final fraud label table 714 facilitates creation of reports to be used by fraud detection system 606 to determine how to make their fraud scoring more effective in real time. That is, the information contained in final fraud label table 714 may be used to modify fraud detection system 606 to identify a fraudulent transaction in real time, and therefore avoid having the customer subsequently reporting the transaction as fraudulent. Final fraud label table 714 allows for the creation of a transaction lifecycle that can be used to better recognize a potentially fraudulent transaction during the authorization phase of payment card system 100.

Figure 8A:
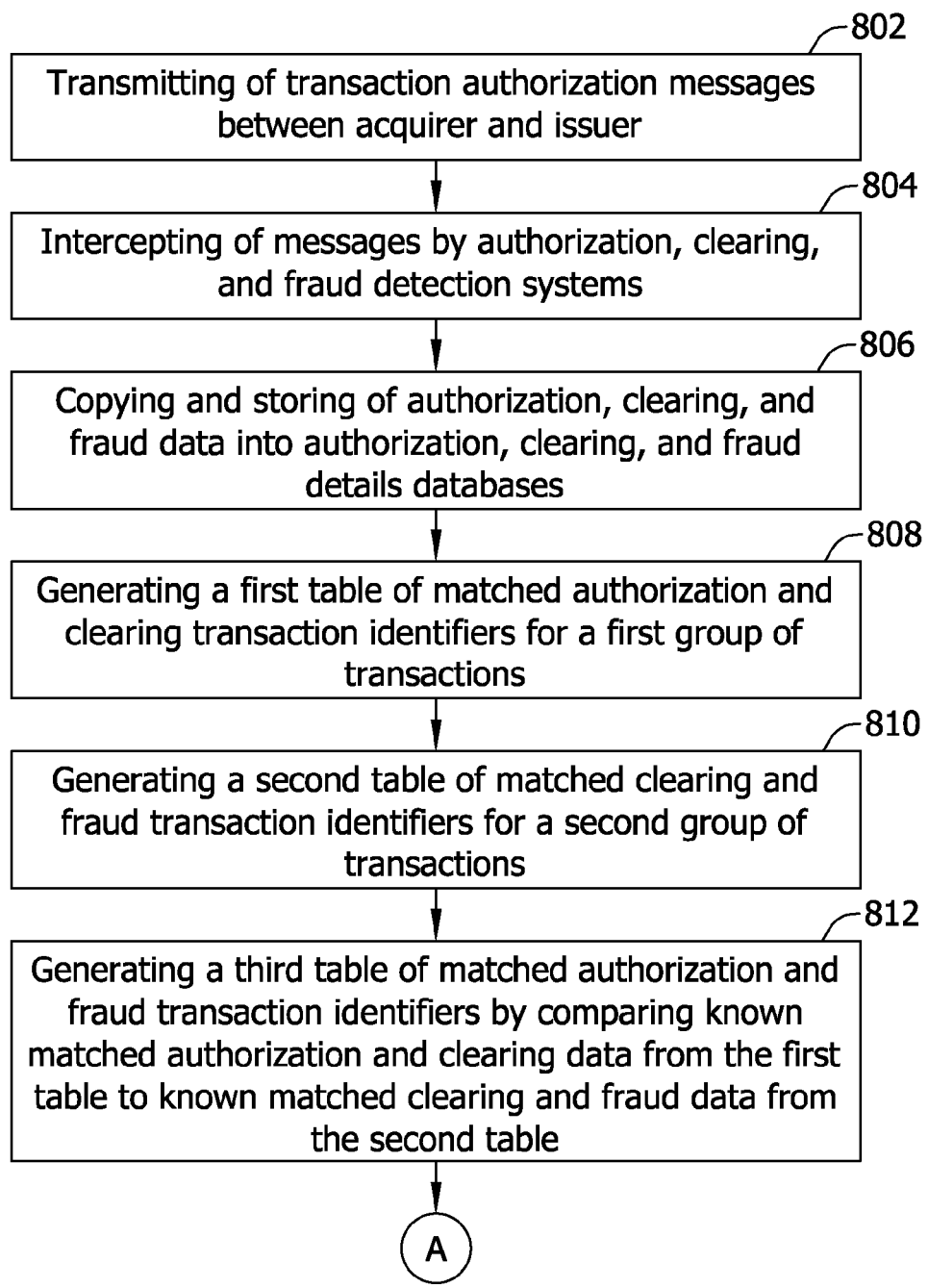
Figure 8B:
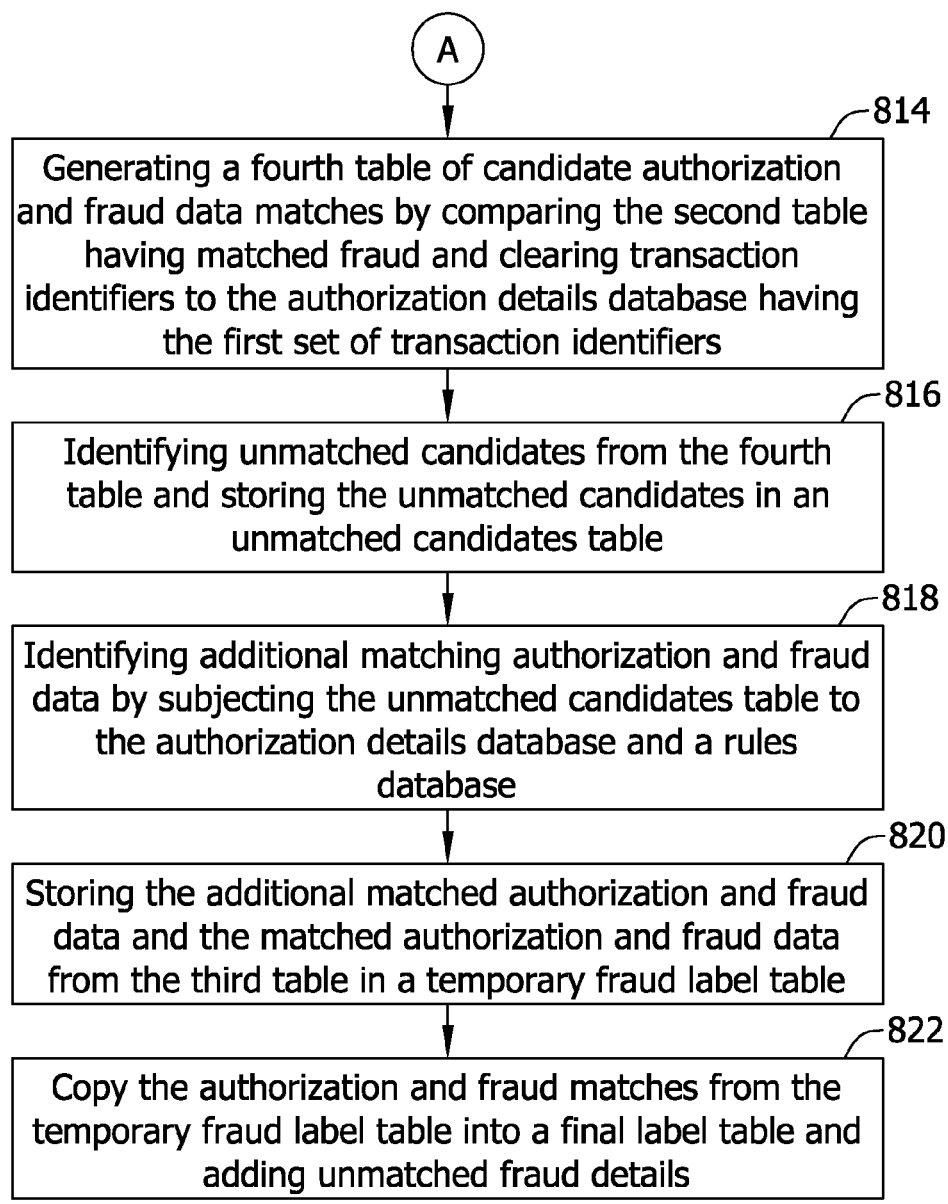

FIG. 8 is a flow diagram 800 illustrating the transaction lifecycle labeling system 112 implemented by the systems shown in FIGS. 2, 3, 6, and 7. In the exemplary embodiment, when a cardholder initiates a transaction of a plurality of transactions by swiping a payment card or using a payment card over a payment network, an authorization request message for the transaction is transmitted 802 by a merchant over the payment network through a server system to an issuer for authorization of the transaction. The issuer analyzes the information contained in the request message and sends a response message to the merchant through the server system with clearing information that will either authorize or decline the transaction. The response message includes transaction identifiers including a 6-digit authorization code and/or any other transaction identifying data. In the United States, an additional transaction identifier, a bank network reference number, is attached to each authorized transaction, but is not included in the message if the transaction is fraudulent. Fraudulent transactions are assigned an acquirer-assign sequence number that is not included in the authorization data.

The server system includes at least an authorization system, a clearing system, and a fraud detection system, while a transaction lifecycle labeling system is in communication with both the server system and a data warehouse. When the transaction is authorized, the authorization system intercepts 804 the response message from the issuer, copies 806 the transaction data, including the bank network reference number, the 6-digit authorization code, and/or any other data that may be used to identify a transaction, and stores 806 the data in and authorization details database in the data warehouse. The authorization data in the authorization details database includes a first set of transaction identifiers. The clearing system likewise intercepts 804 the response message from the issuer, then copies 806 and stores 806 the transaction data including the transaction identifiers in a clearing details database in the data warehouse. The clearing data in the clearing details database includes a second set of transaction identifiers. The fraud detection system also intercepts 804 the issuer's response message and copies and stores 806 the transaction data including the transaction identifiers in a fraud details database. The fraud data in the fraud details database includes a third set of transaction identifiers. The fraud detection system uses the transaction identifiers in the response message, such as amount of sale, geographic location of the sale, and/or any other data that may be used to identify the transaction to assign a fraud score to the transaction.

The scored transaction is sent to the issuer to authorize or decline based on the fraud score. The issuer may also contact the cardholder for authorization. A transaction cannot be fraudulent until a financial impact has occurred. When an issuer declines a transaction or the cardholder reports fraudulent activity, the issuer then reports such to the fraud detection system which flags the transaction as fraudulent and stores the transaction data as a batch file that is sent in a daily feed to the fraud details database in the data warehouse. Because the fraud may not be reported to the issuer by the user for some time after the transaction actually occurs, the batch file contains transactions occurring over a 120 day period to verify no other fraudulent activity took place around the time of the reported fraud. Within the fraud details database is code that can determine whether the transaction was fraudulent or not, based on the issuer's report, and if not, then the data can be deleted from the fraud details database or the fraud details database may update or change the data and send it to a different database. Code within the fraud details database determines whether or not the transactions have been deleted or changed, which affects the ability to later match fraud data with authorization data. If an authorized transaction is later matched with a fraudulent transaction, but that fraudulent transaction has been deleted or changed by the fraud details database, then that would be a false match between the authorization and fraud data. The fraud details database prevents this from occurring.

A clearing and authorization matching system within the data warehouse is able to search the authorization and clearing feeds coming into the data warehouse through the server system for their respective transaction identifiers. The first set of transaction identifiers (authorization data) includes a plurality of transaction identifiers, at least some of which are also included in the second set of identifiers (clearing data). The clearing and authorization matching system then generates 808 a first table having matched authorization and clearing transaction identifiers for a first group of payment transactions. The first group of payment transactions may be identified based at least in part on a transaction date, among other transaction factors. Initially, this match results in only a limited number of matches because the clearing and authorization matching system includes only the U.S. bank network reference numbers. In order to generate a complete list of matching authorization and clearing data, the clearing and authorization matching system incorporates the clearing details database containing both U.S. bank network reference numbers and foreign 6-digit authorization codes. The resulting first table having matched authorization and clearing transaction identifiers is stored in a clearing and authorization matches table.

As previously described, when the fraud detection system flags a transaction as fraudulent, based on the fraud reports from the issuer or the computed fraud score, it stores the fraudulent transaction data, including an acquirer-assigned sequence number and/or any other data that may be used to identify the transaction in the fraud details database as the third set of transaction identifiers. The clearing system stores the same transaction data as the second set of transaction identifiers, including the acquirer-assigned sequence number in the clearing details database. The fraud detection system can then search the fraud details and clearing details databases in the data warehouse for their respective acquirer-assigned sequence number or other transaction identifiers. The second set of transaction identifiers (clearing data) includes a plurality of transaction identifiers that are also included in the third set of identifiers (fraud data). However, the third set of transaction identifiers (fraud data) and the first set of transaction identifiers (authorization data) have no common identifiers. The fraud detection system, including SAFE System, generates 810 a second table of matched fraudulent and clearing transaction identifiers for a second group of payment transactions by matching at least the corresponding acquirer-assigned sequence number and/or any other transaction identifiers from the fraud data and the clearing data. The second group of payment transactions may be identified based at least in part on a transaction date, among other transaction factors, and may contain at least some corresponding transactions with the first group of payment transactions. The second table of transaction identifiers with matched fraud data and clearing data is stored in a fraud and clearing matches table within the data warehouse The transaction labeling module 700 retrieves, from the data warehouse, the first table having matched authorization and clearing transaction identifiers and the second table having matched fraud and clearing transaction identifiers. The transaction labeling module then generates 812 a third table of transaction identifiers having matching authorization data and fraud data for each payment transaction common to both the first group and the second group of transactions by comparing known matched authorization and clearing transaction identifiers of the first table to known matched fraud and clearing transaction identifiers of the second table. That is, the transaction labeling module analyzes the first and second tables to identify transaction identifiers from the second set of identifiers (clearing data) that occur in both the first set of identifiers (authorization data) and the second set of identifiers (fraud data). When a clearing transaction identifier from the first table is matched with a clearing transaction identifier from the same transaction from the second table, the authorization transaction identifier from the first table can be matched with the fraudulent transaction identifier from the second table. These matches are stored in an initial authorization and fraud matches table and copied into a temporary fraud label table.

The third table having matched authorization and fraud transaction identifiers may not include all transactions included within the first table because not all transactions may have been labeled potentially fraudulent. This is one reason the first and second group of transactions contain some transactions in common, where the authorized transaction was reported as fraudulent, and some different transactions, where the transaction was authorized and not fraudulent or it was deemed fraudulent before it was authorized. To identify the additional authorization data and fraud data matches, the transaction labeling module generates 814 a fourth table of candidate authorization and fraud data matches by comparing the second table having matched fraud and clearing transaction identifiers is to the authorization details database having the first set of transaction identifiers. The fourth table contains matched authorization and fraud transaction identifiers contained in the third table as well as unmatched candidate transaction identifiers because there is extraneous data within the fourth table that will not be matched. Not every authorized transaction will have corresponding fraud transaction data because not every authorized transaction is fraudulent. The fourth table having candidate authorization and fraud matches contains extra transaction information that will not be matched, but it also contains transaction information that will be matched because some of the authorized transactions will have corresponding fraud data. The transaction labeling module identifies and stores 816 the unmatched candidates in an unmatched candidate table.

The transaction labeling module then identifies 818 additional matching authorization and fraud data by subjecting the unmatched candidates table to the authorization details database and a rules database located within the data warehouse. The rules database is a set of dynamic structured query language statements where each "rule" is expressed as a fragment of structured query language designed to analyze the transaction data of the unmatched candidate table and determine matches based on identifying transaction keys such as the date and time of the transaction, amount of transaction, issuer identification number, transaction process date, and/or any other data that may be used to identify a transaction. The resulting additional matches of authorization and fraud data are stored 820 in the temporary fraud table with the third table having matched authorization and fraud transaction identifiers such that the temporary fraud label table contains all identifiable transaction having matched authorization and fraud data.

The matches within the temporary fraud label table are then copied 822 into a final fraud label table so the matches may be accessible to the data warehouse and therefore useful for reporting. Data from an unmatched fraud details database is then added 822 to the final fraud label table such that the final fraud label table includes all the identifiable authorization and fraud transaction identifier matches from the temporary fraud label table and all unmatched fraud data from the unmatched fraud details database. The data in the unmatched fraud details database is unmatched transaction identifiers from a daily feed from the fraud details database generated by the fraud detection system. The result of combining the temporary fraud label table and the unmatched fraud details database is that, each day, the final fraud label table maintains a one-to-one ratio of transaction identifiers with the unmatched fraud detail database, thus keeping final fraud label table and unmatched fraud details database in sync for reporting performance and ensuring that every fraudulent transaction is represented in the final fraud table whether or not it has a matching transaction identifier with the authorization or clearing transaction identifiers.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for labeling payment transactions with a transaction lifecycle label using a lifecycle labeling computer system, the lifecycle labeling computer system includes a processor and is in communication with a database, the payment transactions initiated by a cardholder using a payment card over a payment system, said method comprising:

storing, using the processor, transaction data associated with a plurality of payment transactions within the database, the transaction data including authorization data having a first set of transaction identifiers, clearing data having a second set of transaction identifiers, and fraud data having a third set of transaction identifiers;

generating, using the processor, a first table of matched transaction identifiers for a first group of payment transactions included within the plurality of payment transactions by matching authorization data to clearing data for the first group of payment transactions based at least in part on corresponding transaction identifiers included in both the first set of transaction identifiers and the second set of transaction identifiers;

generating, using the processor, a second table of matched transaction identifiers for a second group of payment transactions included within the plurality of payment transactions by matching clearing data to fraud data for the second group of payment transactions based at least in part on corresponding transaction identifiers included in both the second set of transaction identifiers and the third set of transaction identifiers;

generating, using the processor, a third table of matched transaction identifiers by comparing the first table of transaction identifiers to the second table of transaction identifiers, the third table of transaction identifiers having matched authorization transaction identifiers and fraud transaction identifiers from the first and second groups of payment transactions.

2. A method according to claim 1, wherein the second set of transaction identifiers includes transaction identifiers in common with the first set of transaction identifiers and the third set of transaction identifiers.

3. A method according to claim 2, wherein the first set of transaction identifiers and the third set of transaction identifiers have no common transaction identifiers.

4. A method according to claim 1, wherein the first group of payment transactions and the second group of payment transactions contain at least some of the same transactions.

5. A method according to claim 1, wherein storing transaction data further comprises:

retrieving transaction data from the payment system; and
storing authorization data in an authorization details database, clearing data in a clearing details database, and fraud data in a fraud details database.

6. A method according to claim 1 further comprising storing the first table of transaction identifiers in a clearing and authorization matches table.

7. A method according to claim 1 further comprising storing the second table of transaction identifiers in a clearing and fraud matches table.

8. A method according to claim 1 further comprising storing the third table of transaction identifiers in an authorization and fraud matches table.

9. A method according to claim 1, wherein the clearing data is matched to the fraud data by a fraud detection system.

10. A method according to claim 1 further comprising generating a fourth table of transaction identifiers by matching the second table of transaction identifiers with the first set of authorization data transaction identifiers, the fourth table of transaction identifiers includes candidate matches of fraud data and authorization data, wherein the fourth table of transaction identifiers includes the matched authorization and fraud transaction identifiers of the third table and unmatched authorization and fraud transaction identifiers.

11. A method according to claim 10, wherein the unmatched authorization and fraud transaction identifiers are stored in an unmatched authorization and fraud candidates table and subjected to a rules database and the authorization data to identify additional transaction identifiers having matching fraud data and authorization data.

12. A method according to claim 11 further comprising storing the additional transaction identifiers having matching fraud data and authorization data identified by the rules database in a temporary fraud label table.

13. A method according to claim 12, further comprising combining the authorization and fraud matches table with the temporary fraud label table into a final fraud label table, the final fraud label table having all transaction identifiers with matching fraud data and authorization data.

14. A method according to claim 13, further comprising adding unmatched fraud data to the final fraud label table such that every payment transaction having fraud data is represented in final fraud label table by its corresponding transaction identifier.

15. A computer device for labeling payment transactions with a transaction lifecycle label, said computer system comprising:
a database for storing transaction data associated with a plurality of transactions, the transaction data includes authorization data having a first set of transaction identifiers, clearing data having a second set of transaction identifiers, and fraud data having a third set of transaction identifiers;
a processor communicatively coupled to said database, said processor further configured to:
store the transaction data of the plurality of transactions received from a payment system within the database;
generate a first table of matched transaction identifiers for a first group of payment transactions included within the plurality of payment transactions by matching authorization data to clearing data for the first group of payment transactions based at least in part on corresponding transaction identifiers included in both the first set of transaction identifiers and the second set of transaction identifiers;
generate a second table of matched transaction identifiers for a second group of payment transactions included within the plurality of payment transactions by matching clearing data to fraud data for the second group of payment transactions based at least in part on corresponding transaction identifiers included in both the second set of transaction identifiers and the third set of transaction identifiers;
generate a third table of matched transaction identifiers by comparing the first table of transaction identifiers to the second table of transaction identifiers using the lifecycle labeling computer system, the third table of transaction identifiers having matched authorization transaction identifiers and fraud transaction identifiers from the first and second groups of payment transactions.

16. The computer device in accordance with claim 15, wherein the second set of transaction identifiers includes transaction identifiers in common with the first set of transaction identifiers and the third set of transaction identifiers.

17. The computer device in accordance with claim 16, wherein the first set of transaction identifiers and the third set of transaction identifiers have no common transaction identifiers.

18. The computer device in accordance with claim 15, wherein the first group of payment transactions and the second group of payment transactions contain at least some of the same transactions.

19. The computer device in accordance with claim 15, wherein the transactions include a payment transaction initiated by a cardholder using a payment card over a payment system, and wherein said processor is further configured to:
retrieve transaction data from the payment system; and
store authorization data in an authorization details database, clearing data in a clearing details database, and fraud data in a fraud details database.

20. The computer device in accordance with claim 15, wherein the first table of transaction identifiers is stored in a clearing and authorization matches table, the second table of transaction identifiers is stored in a clearing and fraud matches table, and the third table of transaction identifiers is stored in an authorization and fraud matches table.

21. The computer device in accordance with claim 15, wherein the clearing data is matched to the fraud data by a fraud detection system.

22. The computer device in accordance with claim 15, wherein a fourth table of transaction identifiers is generated by matching the second table of transaction identifiers with the first set of authorization data transaction identifiers, the fourth table of transaction identifiers includes candidate matches of fraud data and authorization data, wherein the fourth table of transaction identifiers includes the matching authorization and fraud transaction identifiers of the third table and unmatched authorization and fraud transaction identifiers.

23. The computer device in accordance with claim 22, wherein the unmatched authorization and fraud transaction identifiers are stored in an unmatched authorization and fraud candidates table and subjected to a rules database and the authorization data to identify additional transaction identifiers having matching fraud data and authorization data.

24. The computer device in accordance with claim 23, wherein the additional transaction identifiers having matching fraud data and authorization data identified by the rules database are stored in a temporary fraud label table.

25. The computer device in accordance with claim 24, wherein the authorization and fraud matches table is combined with the temporary fraud label table into a final fraud label table, the final fraud label table having all transaction identification numbers with matching fraud data and authorization data.

26. The computer device in accordance with claim 25, wherein unmatched fraud data is added to the final fraud label table such that every payment transaction having fraud data is represented in final fraud label table by its corresponding transaction identifier.

27. One or more non-transitory computer-readable storage media having computer-executable instructions embodied thereon for labeling payment transactions with a transaction lifecycle label using a lifecycle labeling computer system, the payment transactions initiated by a cardholder using a payment card over a payment system, wherein when executed by a computer coupled to a database, the computer-executable instructions cause said computer to:
store transaction data associated with a plurality of payment transactions within the database, the transaction data including authorization data having a first set of transaction identifiers, clearing data having a second set of transaction identifiers, and fraud data having a third set of transaction identifiers;
generate a first table of matched transaction identifiers for a first group of payment transactions included within the plurality of payment transactions by matching authorization data to clearing data for the first group of payment transactions based at least in part on corresponding transaction identifiers included in both the first set of transaction identifiers and the second set of transaction identifiers;
generate a second table of matched transaction identifiers for a second group of payment transactions included within the plurality of payment transactions by matching clearing data to fraud data for the second group of payment transaction based at least in part on corresponding transaction identifiers included in both the second set of transaction identifiers and the third set of transaction identifiers;

generate a third table of matched transaction identifiers by comparing the first table of transaction identifiers to the second table of transaction identifiers using the lifecycle labeling computer system, the third table of transaction identifiers having matched authorization transaction identifiers and fraud transaction identifiers from the first and second groups of payment transactions.

28. The one or more non-transitory computer-readable storage media in accordance with claim 27, wherein the second set of transaction identifiers includes transaction identifiers in common with the first set of transaction identifiers and the third set of transaction identifiers.

29. The one or more non-transitory computer-readable storage media in accordance with claim 28, wherein the first set of transaction identifiers and the third set of transaction identifiers have no common transaction identifiers have no common transaction identifiers.

30. The one or more non-transitory computer-readable storage media in accordance with claim 27, wherein the first group of payment transactions and the second group of payment transactions contain at least some of the same transactions.

31. The one or more non-transitory computer-readable storage media in accordance with claim 27, wherein a fourth table of transaction identifiers is generated by matching the second table of transaction identifiers with the first set of authorization data transaction identifiers, the fourth table of transaction identifiers includes candidate matches of fraud data and authorization data, wherein the fourth table of transaction identifiers includes the matching authorization and fraud transaction identifiers of the third table and unmatched authorization and fraud transaction identifiers.

* * * * *